United States Patent [19]
Belrose

[11] 4,185,782
[45] Jan. 29, 1980

[54] BROADCAST SPRAYER

[76] Inventor: Frank R. Belrose, Box 456, Rte. 1, Shakopee, Minn. 55379

[21] Appl. No.: 852,517

[22] Filed: Nov. 17, 1977

[51] Int. Cl.$^2$ ..................... B05B 17/00; A01C 23/00
[52] U.S. Cl. ............................. 239/663; 239/222.11; 239/379; 239/662
[58] Field of Search ............... 239/224, 289, 379, 662, 239/663, 665, 214, 222.11, 218.5

[56] References Cited
U.S. PATENT DOCUMENTS

| | | | |
|---|---|---|---|
| 447,778 | 3/1891 | Kisinger | 239/224 |
| 809,046 | 1/1906 | Collins | 239/224 X |
| 1,751,531 | 3/1930 | Schars | 239/214 X |
| 2,856,191 | 10/1958 | Kolb | 239/665 X |
| 2,957,630 | 10/1960 | Lamb | 239/379 X |
| 3,206,215 | 9/1965 | De Jong | 239/218.5 X |
| 3,623,638 | 11/1971 | Henning et al. | 239/314 X |

FOREIGN PATENT DOCUMENTS 285837  5/1931  Italy ......................................... 239/224

Primary Examiner—Robert W. Saifer
Attorney, Agent, or Firm—Thomas A. Lennon

[57] ABSTRACT

A dual purpose sprayer and spreader device capable of selectively distributing either granular or liquid material upon the ground being traversed. The device includes a hopper supported for travel over the ground, the hopper having a discharge opening in the bottom thereof through which granular material from the hopper falls by gravity onto a rotary impeller which throws the material laterally, the impeller being driven by the ground wheels. To distribute a liquid, a container of liquid, (such as a flexible bag) is inserted in the hopper, the bag having a dispensing tube extending from the lower end thereof, which tube extends through the discharge opening at the bottom of the hopper. The hopper is also provided with a slidable gate which controls the size of the discharge opening from fully open to fully closed and when the tube extends therethrough, the gate functions as a valve for opening and closing the tube. When the tube is open, liquid drops by gravity from the bag through the tube to the rotary impeller and is thrown laterally in the same fashion that dry granular material is distributed by the same device.

23 Claims, 9 Drawing Figures

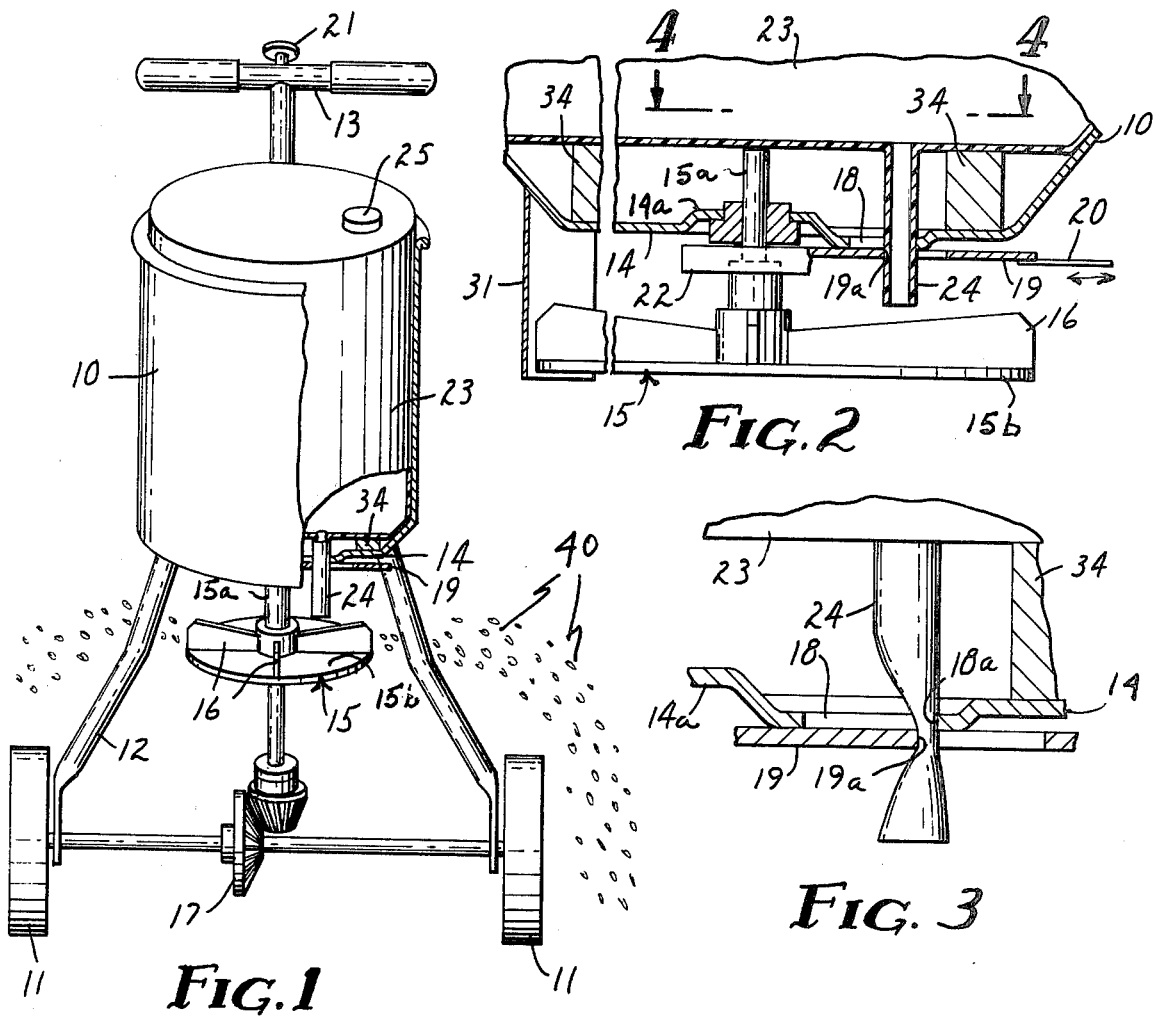
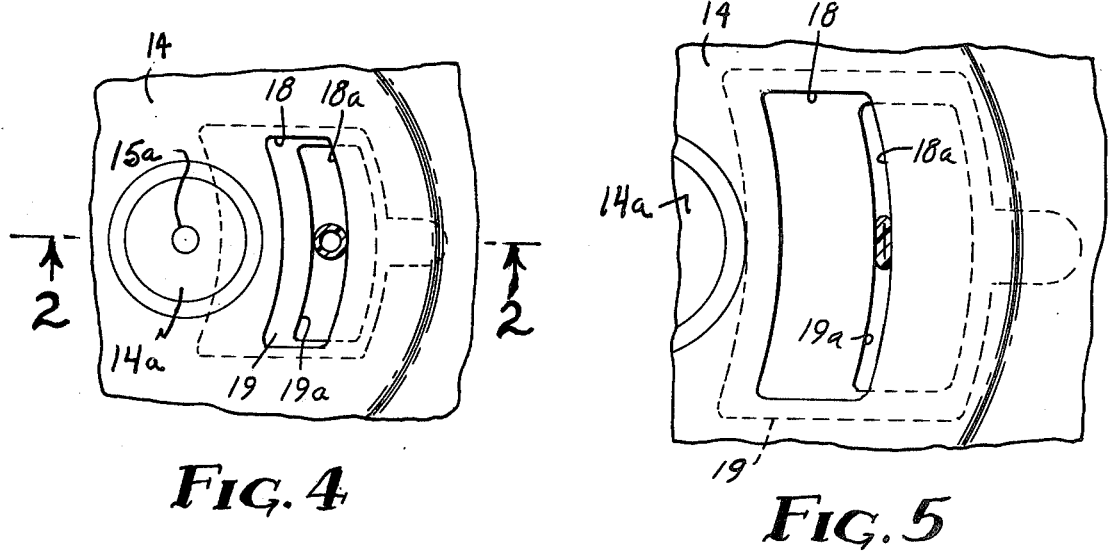

BROADCAST SPRAYER

In the care and maintenance of turf such as home lawns, golf courses, cemetaries, etc., the turf is treated with various products such as fertilizers, herbicides, insecticides, seed, etc. Some of these products are available in both liquid and granular form, and others are available only in granular or liquid form. Thus, the average turf maintainer such as a homeowner needs means available to him for selectively applying liquids and solids to the turf. Until now, the homeowner has had to acquire one device to apply the liquids and another device to apply the solids. No one device has been available which is capable of applying both liquids and solids.

The homeowner has long had available to him a variety of devices for spreading dry material such as fertilizer or grass seed upon lawns. Despite the fact that many of these devices are available for spreading dry, granular material, none have been developed to date which are effective to selectively spread or distribute either dry granular material such as granular fertilizer or grass seed or a liquid such as liquid fertilizer or liquid herbicides or liquid insecticides or any other type of liquid upon the lawn of the average homeowner. Furthermore, no commercially successful devices have been developed which enable non-pressurized liquid to be dispensed by gravity on a lawn from a device which can be easily and quickly pushed around the yard. To date, the commercially available liquid spreaders have involved units carried by the operator, the liquid being distributed under pressure by a nozzle, with some type of pumping device being provided to maintain enough pressure to push the liquid out of the nozzle and onto the lawn. These pressurized devices make it more difficult to control the distribution, resulting in spray blowing or drifting onto vegetation or shrubs which are damaged thereby.

In addition to a dearth of devices which can travel over the ground to spread liquid materials on the lawn, the conventional gravity type distributor for dry granular material gets very limited use during the season because it is a limited purpose machine and the average homeowner does not fertilize his lawn that often. Therefore, the vast majority of the time, the distributor of dry granular material is sitting idle in the garage or basement.

An object of this invention is, therefore, to provide an inexpensive, convenient, easy to operate liquid spraying device specially designed for applying liquids such as fertilizers, herbicides and insecticides to lawns and other comparable turf areas.

Another object of this invention is to provide a device for spreading liquids upon turf in which gravity may be utilized rather than pressure to get the liquid evenly distributed upon the turf area, thereby eliminating the drift hazard to flowers, shurbs, etc.

Still another object is to provide a device designed for traveling over turf and other comparable areas and which is equally capable of spreading a liquid or a dry granular material upon the turf being traveled over.

Still another object is to provide a liquid spraying device in which the liquid can be uniformly applied in a wide area, thereby avoiding over concentration and possible damage to the turf being treated.

Still another object is to provide a device capable of interchangeable use for liquids or dry granular material with a minimum of changeover inconvenience and time.

Another object is to provide a mobile ground traveling applicator capable of dispensing liquid by gravity flow instead of under pressure, and which can be selectively designed for use on relatively small areas such as home lawns, or for much larger areas such as roadways, golf courses, farmland, etc.

These and other uses, objects, and advantages, will be readily apparent from a review of the attached drawings and a reading of the following description which relates to said drawings, and in which drawings:

FIG. 1 is a front perspective view of one preferred form of applicator of this invention, with portions broken away.

FIG. 2 is a fragmentary vertical side sectional view on an enlarged scale of the lower portion of the device taken on line 2—2 of FIG. 4 with the dispensing tube open.

FIG. 3 is an enlarged view of FIG. 2, showing the dispensing tube in closed condition;

FIG. 4 is a fragmentary plan view of a portion of the hopper bottom as seen from line 4—4 of FIG. 2;

FIG. 5 is a fragmentary detailed plan view on an enlarged scale of FIG. 4 showing the dispensing tube in a closed condition.

Figure 6:
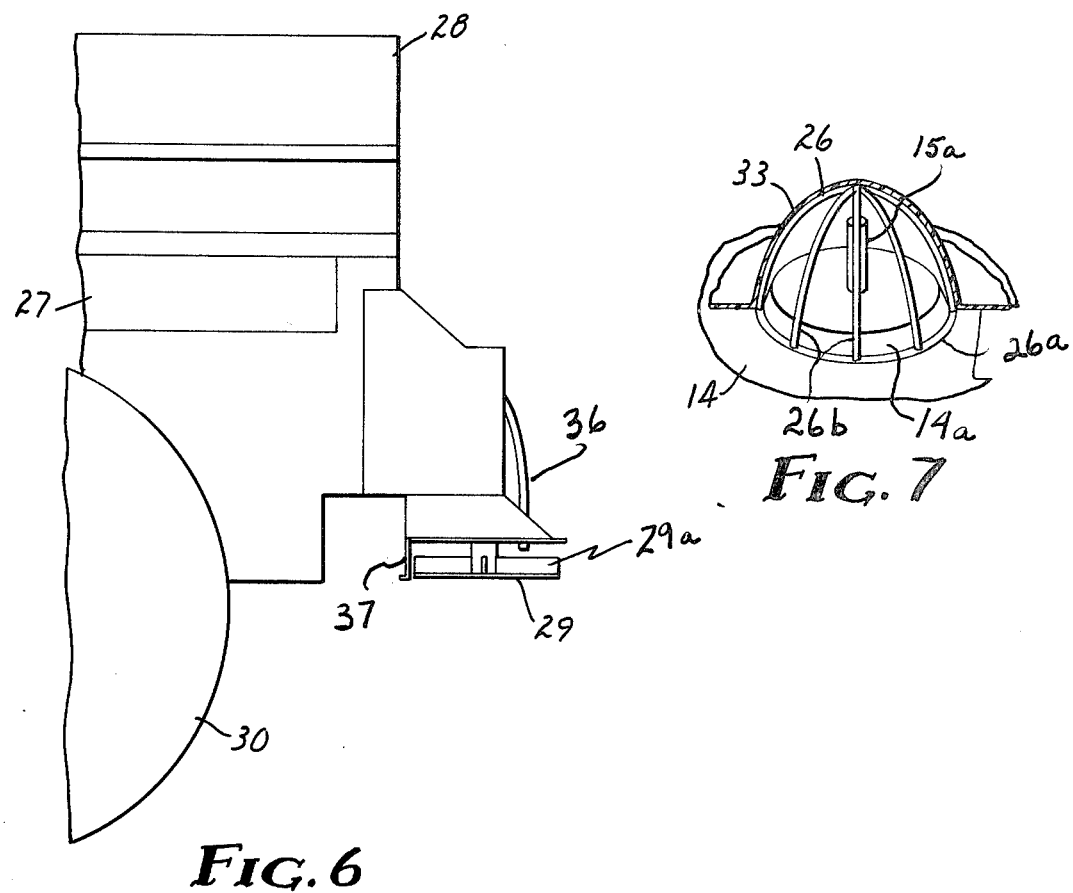
FIG. 6 is a fragmentary side elevational view of the rear of a truck embodying an alternative form of the invention.

Referring to the drawings, and initially to FIG. 1, the applicator or spreader of the invention includes a cylindrical hopper 10 which is supported by a pair of ground wheels 11 which travel over the ground, the wheels and hopper being interconnected by a supporting frame 12. The device is manually propelled over the ground by a handle 13 and is provided with leg structure (not shown) to enable the applicator to maintain a substantially upright position when resting in stationary condition on the ground. A rotary impeller 15 is mounted beneath the hopper 10 and is designed to receive material from the hopper, the impeller being provided with upstanding vanes or blades 16 which are designed to collect the material falling on the impeller and throw the material laterally by centrifugal force as the impeller rotates in a substantially horizontal plane about the vertical axis provided by impeller shaft 15a.

The impeller 15 in turn is rotated in response to the movement of the applicator over the ground by a drive or transmission system indicated generally at 17 whereby the impeller is driven directly by the wheels 11 so that when the wheels are not moving and the device is stationary, the impeller is stationary, with the speed of the impeller being directly related to the speed at which the wheels 11 are traveling, which means that the speed of rotation of the impeller 15 is directly related and proportional to the ground speed of the device, i.e.—the faster the ground speed, the faster the speed of rotation of the impeller.

The bottom 14 of the hopper is provided with a discharge opening or slot 18, the effective size of which is controlled by a sliding gate or door 19 beneath and contiguous to the hopper bottom, which gate is capable of moving horizontally relative to the slot 18 between a fully opened and fully closed position. By controlling the effective size of the slot 18, it is possible to directly control the quantity and density of the material being spread. The movement of gate 19 is controlled by the longitudinal movement of an elongate feed rod 20 which is supported by the handle 13 and actuated by pushing on a control knob 21 attached to the outer end of said rod 20 and mounted on the upper end of the handle 13 for convenient manipulation by the operator.

The gate 19 is of flat plate or sheet construction and is slidably supported by a bracket 22 attached to the underside of the hopper bottom wall 14.

A container 23, preferably of lightweight rigid plastic material, is installed inside the hopper 10, said container having an elastic normally open dispensing tube 24 communicating with the interior thereof and extending downwardly therefrom through opening 18. The container 23 is of cylindrical cross-section, with an outer diameter just slightly less than the inner diameter of the hopper 10, to enable container 23 to easily slide vertically into and out of the hopper 10, and yet be firmly supported thereby. In the situation in FIGS. 1 and 2, means need to be provided to prevent container 23 from coming into contact with the top of impeller shaft 15a, to avoid being damaged by the impeller shaft when it is rotating. This means in FIG. 1 takes the form of a stop ring 34 which rests on the hopper bottom and engages and holds the container above and out of engagement with shaft 15a. The stop ring 34 is removable so as not to interfere with the movement of granular material in the hopper when it is used to dispense granular material.

The tube 24, when extended downwardly through the slot 18, is disposed between the outer edge 18a of the slot and the leading edge 19a of the metering gate. These two edges 18a and 19a function as a valve means to selectively open or close the tube by respectively releasing the tube or pinching it therebetween. Because of the resilient, deformable elastic qualities of the tube 24, it can be readily pinched between the gate 19 and the slot 18 in the hopper bottom so as to press the interior wall surfaces of the tube together and seal off the interior, completely preventing any liquid from passing through. As the edges 18a and 19a are moved away from each other, the tube opening gets progressively bigger until its elasticity ultimately returns the tube to its normal fully open position. Thus, there are incremental opening sizes between fully open and fully closed which provide the operator with a range of discharge rates to help control the amount and the density of the liquid being dispersed on the ground being traversed.

FIGS. 2 and 4 illustrate the tube 24 in open dispensing condition, and FIGS. 3 and 5 illustrates the tube 24 in pinched closed non-dispensing condition. The opening and closing of the tube is accomplished by the sliding movement of the gate 19 in response to actuation of the control rod 20 by manipulation of the control knob 21.

Thus, in operation, to apply a liquid, such as a liquid herbicide, the container 23 is installed in the hopper 10, either with the container completely or partially full, or even empty. If empty, the container will, after installation in the hopper, have liquid added thereto through a capped fill opening 25 in the top portion of the container.

The tube 14 may also be provided with supplemental valve means such as a pinch clamp 35 to be used for container transport purposes apart from the applicator or when the container 23 is being installed in or removed from the hopper 10 with liquid therein but which can be removed or left open once the container and its tube are properly installed.

Once the liquid container 23 is installed and the tube 24 is properly positioned in a pinched closed condition by the gate edge 19a and slot edge 18a, the device is ready to apply the liquid. To accomplish this, the operator positions the applicator in the direction he wishes to travel, pushes down on the control knob 21 to open the tube, and simultaneously starts to push forward on the handle 13, causing the wheels 11 to travel over the ground. As the wheels 11 turn, they cause the impeller 15 to rotate through the functioning of the drive system 17. The liquid travels downwardly by gravity from the container 23 through the tube 24 onto the impeller 15, where it is collected and thrown laterally outwardly by centrifugal force by the upstanding vanes 16 of the impeller in generally uniformly dispersed droplets. Because it is an unpressurized system, there is no fogging or misting of the liquid which can drift into flowers, shrubs, etc. and damage them, which is one of the principal drawbacks of available pressurized systems.

If the operator wishes to stop or turn around, he pulls back on the control knob 21, thereby drawing gate edge 19a towards edge 18a of the discharge slot and pinching and closing the tube 24 therebetween, as seen in FIGS. 3 and 5, so that there is no liquid flow when such is not desired.

The device of the invention is also capable of distributing dry fluent granular material such as fertilizer or grass seed. For such purposes, the hopper 10 is used without the presence of the container 23, tube 24, and stop ring 34. To operate for dry fluent granular material, the gate 19 is slid relative to slot 18 so as to completely underlie and close same.

Dry fluent material in the desired amount is then added to hopper 10. When the applicator is properly positioned and ready to distribute granular material, the knob 21 is pushed forward, opening the slot 18, and the dry granules drop by gravity unto impeller 15, where they are collected and throw laterally by the vanes in the same manner as the liquid is distributed, the impeller again being driven by the movement of the ground wheels 11 through the drive system 17.

The container 23 may be of rigid wall construction, or may take the form of a flexible bag, depending in part upon the specific design of the applicator and the location of various parts in the interior of the hopper 10.

Figure 7:
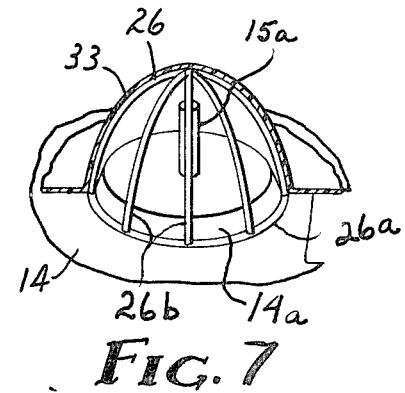
FIG. 7 is a fragmentary perspective view of another alternative form of the invention utilizing a collapsible plastic bag and a guard to protect same.

An example of the use of a collapsible bag is illustrated in FIG. 7, in which a flexible plastic bag 33 is shown on the floor of the hopper 10. The bag must be protected from the rotating impeller shaft 15a, and to accomplish this, protective means are provided in the form of a wire cage 26 which is placed over the impeller shaft and rests on the floor of the hopper. The cage 26 serves to hold the plastic bag 33 away from and out of contact with the impeller. The cage is freely removable from the hopper if desired.

Figure 8:
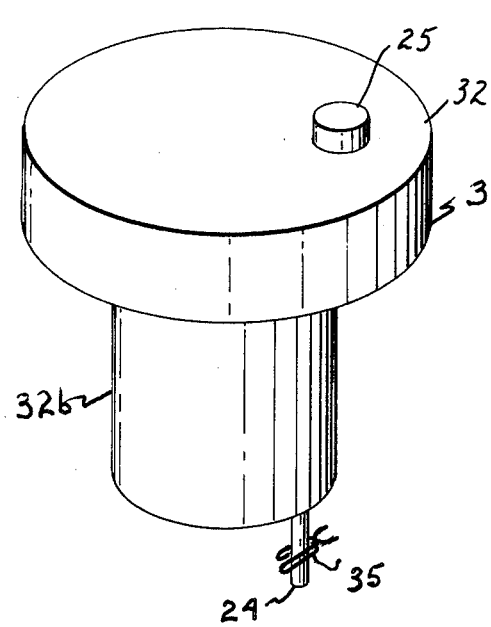
FIG. 8 is a perspective view of an alternate form of liquid container of this invention.
Figure 9:
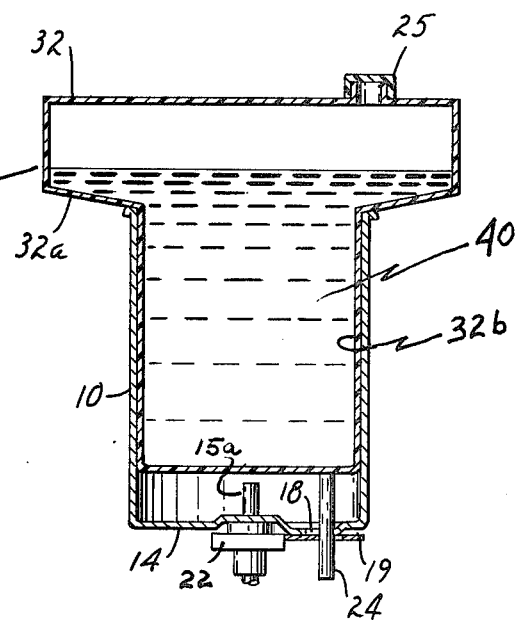
FIG. 9 is a vertical cross-sectional view of the container of FIG. 8 installed in the hopper.

Another form of container 32 of this invention is shown in FIGS. 8 and 9. This container is generally T-shaped in vertical cross-section, and has a lower cylindrical portion 32b which fits snugly inside the hopper 10, and a larger upper cylindrical portion 32c which has a slightly sloping bottom wall 32a to insure that all the liquid drains from the upper to the lower portion. This container also has an upper fill cap 25 and a dispensing tube 24 similar to those previously described, as does the plastic bag 33, although these items aren't shown in the drawings with respect to bag 33.

The container 32 is preferably of rigid lightweight plastic, and rests on the upper edge of the hopper 10, the upper edge of the hopper engaging the sloping surface 32a to support the container 32 so that the lower face or bottom of lower part 32b is held at the desired level above the bottom of the hopper and out of engagement with the rotating impeller shaft 15a.

The T-shaped design of container 32 provides maximum support along with increased capacity from the enlarged upper end.

In the event that the liquid dispersed by the impeller may be thrown too far rearwardly unto the operator, a shield 31 may be provided to protect the operator.

The same principles may be utilized with larger applicators, such as four wheeled self-propelled trucks having a dump box which is designed to convey dry fluent granular material to a powered rotary impeller similar to impeller 15. The dump box can be modified to receive a liquid tight container with a dispensing tube capable of dispensing liquid unto the impeller.

The principles of the invention may also be used with a tank type truck having a liquid tight tank and dispensing tube or nozzle for dispensing liquid to a rotary impeller, either under pressure or by gravity, which tank would have an alternate discharge means for conveying dry granular fluent material to the impeller.

FIG. 6 illustrates the application of the principles of this invention to a four-wheeled truck 27, having wheels 30, the truck having a liquid tight box with a cover 28 which encloses the box and confines the liquid therein and prevents it from splashing out. The liquid from the box is directed to an impeller 29, which disperses it laterally in the same manner as impeller 15.

This truck mounted version can be used to spray median strips on highways, grass areas along side the highways, and large turf areas such as golf courses, cemetaries, etc.

The liquid to be applied, which in FIGS. 1 and 9 is identified by the numeral 40, is transmitted to the impeller 29 from the truck body through an elongate flexible tube 36 by gravity flow, the liquid flowing or dripping from the above unto the impeller 29, from whence it is thrown laterally by the upstanding vanes 29*a*. In FIG. 6, the liquid flow through the tube 36 is controlled by valve means (not shown), and the impeller 29 is driven by motor means (not shown), so that in the truck mounted version of FIG. 6 the speed of the impeller 29 is not directly related to the ground speed of the applicator, as it is in FIG. 1. It will be noted that the truck mounted version also has a depending shield 37 comparable to shield 31 to prevent the liquid from being thrown into undesirable areas.

Referring again to the cage 26 of FIG. 7, it will be understood that there are a variety of different designs or modes of construction within the scope of the invention for this shielding means. Cage 26 is an effective design, and is substantially hemispherical in contour having a circular wire base 26*a* and a plurality of curved, upstanding spaced wire side member 26*b* all of which meet and are connected to each other at their upper end at the top of the cage. The cage is preferably removable, but can be allowed to remain in the bottom of the hopper when it is used to dispense granular material instead of a liquid. In the illustrated version, the cage 26 contiguously circumscribes the raised center 14*a* of the hopper bottom 14 so that it is properly positioned and centered by 14*a* with respect to shaft 15*a*, and held against sliding movement relative thereto by 14*a*.

It will, of course, be understood that various changes may be made in the various parts and dimensions referred to and illustrated herein, without departing from the scope of this invention.

The impeller 15 as illustrated is effective in distributing both liquids or solids. It includes a substantially horizontal circular plate portion 15*b* which rotates in a substantially horizontal plane about the vertical axis provided by the shaft 15*a*. The liquid or solid material falls by gravity from the tube 24 unto the plate 15*b*, where it is collected by the upstanding vanes 16 mounted on the plate, and thrown laterally in a random pattern of substantially uniform density. If a liquid, it is dispersed in the form of droplets, under controlled conditions, with no fogging or any significant drifting involved.

In addition to the uses already mentioned for the applicator of this invention in treating and maintaining turf areas, said applicator also has additional utility in other fields of use. The principles involved are readily adaptable to the agricultural field where the application of liquid herbicides and insecticides is already big business. In fact, the principles are applicable to any situation where one wants to apply a liquid to a generally horizontal surface, particularly if a controlled application which avoids fogging and drifting is desired.

I claim:

1. A ground traversing fluent material applicator comprising reservoir means capable of holding fluent solid and liquid material,
   distributing means for applying said fluent material to the ground being traversed, and
   means for directing said fluent material from said reservoir means to said distributing means, and,
   wherein said reservoir means includes a hopper, said hopper having a discharge opening in the bottom thereof for discharging fluent granular material therethrough from said hopper to said distributing means,
   a metering gate disposed below said opening,
   means for moving said gate between a first position in which said opening is closed and a second postion in which said opening is open,
   a liquid tight container removably installed in said hopper, and
   a flexible tube extending from said container through said opening for conveying liquid by gravity from said container to said distributing means,
   said tube being open when said gate is in said second position and closed when said gate is in said first position.

2. A ground traversing fluent material applicator comprising reservoir means capable of holding fluent solid and liquid material,
   distributing means for applying said fluent material to the ground being traversed, and
   means for directing said fluent material from said reservoir means to said distributing means and,
   wherein said reservoir means includes a hopper,
   a liquid tight container within said hopper, and
   conduit means for conveying liquid from said container to said distributing means, and
   wherein said container is of flexible collapsible wall construction.

3. A ground traversing fluent material applicator comprising reservoir means capable of holding fluent solid and liquid material,
- distributing means for applying said fluent material to the ground being traversed, and
- means for directing said fluent material from said reservoir means to said distributing means, and
- wherein said reservoir means includes a hopper,
- a liquid tight container within said hopper, and
- conduit means for conveying liquid from said container to said distributing means, and
- including means for maintaining at least a portion of the lower end of said container out of contact with at least a portion of the bottom wall portion of said hopper.

4. A ground traversing fluent material applicator comprising reservoir means capable of holding fluent solid and liquid material,
- distributing means for applying said fluent material to the ground being traversed, and
- means for directing said fluent material from said reservoir means to said distributing means, and
- wherein said reservoir means includes a hopper,
- a liquid tight container within said hopper, and
- conduit means for conveying liquid from said container to said distributing means, and
- wherein said applicator includes an upstanding rotary shaft in the lower portion of said hopper, and
- means for maintaining said container out of engagement with said shaft.

5. A ground traversing fluent material applicator comprising reservoir means capable of holding fluent solid and liquid material,
- distributing means for applying said fluent material to the ground being traversed, and
- means for directing said fluent material from said reservoir means to said distributing means,
- wherein said reservoir means includes a hopper,
- a liquid tight container within said hopper, and
- conduit means for conveying liquid from said container to said distributing means, and
- wherein said applicator includes an upstanding rotary shaft in the lower portion of said hopper, and
- spacing means interposed between said hopper and container for maintaining said container out of engagement with said shaft.

6. A ground traversing fluent material applicator comprising reservoir means capable of holding fluent solid and liquid material,
- distributing means for applying said fluent material to the ground being traversed, and
- means for directing said fluent material from said reservoir means to said distributing means,
- wherein said reservoir means includes a hopper,
- a liquid tight container within said hopper, and
- conduit means for conveying liquid from said container to said distributing means, and
- wherein said applicator includes an upstanding rotary shaft in the lower portion of said hopper, and
- cage means overlying said shaft and holding said container out of engagement therewith.

7. A ground traversing fluent material applicator comprising reservoir means capable of holding fluent solid and liquid material,
- distributing means for applying and fluent material to the ground being traversed, and
- means for directing sadi fluent material from said reservoir means to said distributing means, and
- wherein said reservoir means includes a hopper,
- a liquid tight container within said hopper, and
- conduit means for conveying liquid from said container to said distributing means, and
- wherein said container has a lower portion enclosed by said hopper, and a larger upper portion disposed above said hopper.

8. A ground traversing fluent material applicator comprising reservoir means capable of holding fluent solid and liquid material,
- distributing means for applying said fluent material to the ground being traversed, and
- means for directing said fluent material from said reservoir means to said distributing means, and
- wherein said reservoir means includes a hopper,
- a discharge opening in said hopper for discharging fluent material from said hopper by gravity flow,
- a liquid tight container within said hopper,
- a tube of elastic material which can be opened and closed by pinching same,
- said tube extending through said opening for conveying liquid by gravity flow from said container to said distributing means,
- closure means movable relative to said hopper and adapted to open and close said opening with respect to the flow of granular material through said opening,
- said closure means also being adapted to engage said tube and selectively open and close same.

9. The applicator of claim 8, said distributing means including an impeller rotatable about a substantially vertical axis,
- said impeller including generally horizontal plate means,
- said plate means having generally upstanding vane means mounted thereon,
- said directing means being adapted to convey liquid from said container to said impeller,
- said vane means being adapted to throw said liquid laterally with respect to said axis.

10. The applicator of claim 8, said applicator including ground wheels, and
- drive means interconnecting said ground wheels and distributing means whereby said distributing means is driven by said ground wheels.

11. A ground traversing fluent material applicator comprising reservoir means capable of holding fluent solid and liquid material,
- distributing means for applying said fluent material to the ground being traversed, and
- means for directing said fluent material from said reservoir means to said distributing means,
- wherein said reservoir means includes a hopper,
- a liquid tight container within said hopper, and
- conduit means for conveying liquid from said container to said distributing means.

12. The device of claim 11, wherein said conduit means comprises a flexible tube.

13. The device of claim 12, including valve means for opening and closing said tube.

14. The device of claim 12, and wherein said hopper includes structure defining two edge portions capable of relative movement therebetween,
- said tube being disposed between said edge portions,
- and means for moving said edge portions towards one another whereby said tube is pinched and closed by said edge portions and for moving said edge portions away from each other whereby said tube is released sufficiently to permit liquid to pass therethrough.

15. The device of claim 11, including valve means for opening and closing said conduit means.

16. The applicator of claim 11, wherein said conduit means includes a flexible tube,
valve means for opening and closing said tube,
said applicator being so designed that the operator during normal operation thereof is positioned a distance sufficiently remote from said valve means that he cannot touch said valve means,
and control means for said valve means,
said control means being operable by said operator while in said opertive position.

17. The applicator of claim 16, wherein said control means includes an elongate rod manipulatable by the operator when in normal operative position.

18. The applicator of claim 11, including valve means for opening and closing said conduit means,
valve means for opening and closing said tube,
said applicator being so designed that the operator during normal operation thereof is positioned a distance sufficiently remote from said valve means that he cannot touch said valve means, and
control means for said valve means,
said control means being operable by said operator while in said normal operative position.

19. The applicator of claim 11, wherein said reservoir means includes a hopper, including a discharge opening in said hopper for discharging fluent material from said hopper by gravity flow,
a liquid tight container within said hopper,
a flexible tube extending through said opening for conveying liquid by gravity flow from said container to said distributing means, and
sliding valve means for opening and closing said opening,
said sliding valve means cooperating with stationary hopper structure to pinch said tube therebetween to close said tube.

20. A ground traversing fluent material applicator comprising reservoir means capable of holding fluent solid and liquid material,
distributing means for applying said fluent material to the ground being traversed, and
means for directing said fluent material from said reservoir means to said distributing means, and
wherein said reservoir means includes a hopper,
a discharge opening in said hopper for discharging fluent material from said hopper by gravity flow,
a liquid tight container within said hopper,
means for conveying liquid from said container through said opening to said distributing means, and
valve means for opening and closing said conveying means.

21. A ground traversing fluent material applicator comprising reservoir means capable of holding fluent solid and liquid material,
distributing means for applying said fluent material to the ground being traversed, and
means for directing said fluent material from said reservoir means to said distributing means, and
wherein said reservoir means incudes a hopper,
said hopper having a discharge opening in the bottom thereof for discharging fluent granular material therethrough from said hopper to said distributing means,
a liquid tight container removably installed in said hopper,
a flexible tube extending from said container through said opening for conveying liquid by gravity from said container to said distributing means, and
means for opening and closing said opening to control the flow of granular material from said hopper therethrough, and
means for opening and closing said tube to control the flow of liquid from said container.

22. A ground traversing fluent material applicator comprising reservoir means capable of holding fluent solid and liquid material,
distributing means for applying said fluent material to the ground being traversed, and
means for directing said fluent material from said reservoir means to said distributing means, and
wherein said reservoir means includes a hopper, including a discharge opening in said hopper for discharging fluent material from said hopper by gravity flow,
a liquid tight container within said hopper,
a tube extending through said opening for conveying liquid by gravity flow from said container to said distributing means, and
means for opening and closing said opening and said tube.

23. A ground traversing fluent material applicator comprising reservoir means capable of holding fluent solid and liquid material,
distributing means for applying said fluent material to the ground being traversed, and
means for directing said fluent material from said reservoir means to said distributing means, and
wherein said reservoir means includes a hopper, including a discharge opening in said hopper for discharging fluent material from said hopper by gravity flow,
a liquid tight container within said hopper,
a tube extending through said opening for conveying liquid by gravity flow from said container to said distributing means,
means for controlling the flow of granular material through said opening, and
means for controlling the flow of liquid through said tube.

* * * * *